(12) United States Patent
Blömeke et al.

(10) Patent No.: US 10,612,585 B2
(45) Date of Patent: Apr. 7, 2020

(54) ANGULAR CONTACT BEARING AND GEAR MECHANISM COMPRISING A THRUST WASHER

(71) Applicant: SEW-EURODRIVE GMBH & CO. KG, Bruchsal (DE)

(72) Inventors: Jens Blömeke, Riedstadt (DE); Stefan Hannet, Schwetzingen (DE); Sebastian Höhne, Fürstenfeldbruck (DE); Thomas Huber, Waldsee (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/772,967

(22) PCT Filed: Oct. 24, 2016

(86) PCT No.: PCT/EP2016/025122
§ 371 (c)(1),
(2) Date: May 2, 2018

(87) PCT Pub. No.: WO2017/076506
PCT Pub. Date: May 11, 2017

(65) Prior Publication Data
US 2018/0320735 A1 Nov. 8, 2018

(30) Foreign Application Priority Data
Nov. 3, 2015 (DE) .................. 10 2015 014 087

(51) Int. Cl.
*F16C 19/18* (2006.01)
*F16C 19/54* (2006.01)
(Continued)

(52) U.S. Cl.
CPC .......... *F16C 19/184* (2013.01); *F16C 19/182* (2013.01); *F16C 19/185* (2013.01);
(Continued)

(58) Field of Classification Search
CPC .... F16C 19/182; F16C 19/184; F16C 19/185; F16C 19/463; F16C 19/543; F16C 19/546;
(Continued)

(56) References Cited

U.S. PATENT DOCUMENTS 3,316,035 A 4/1967 Zuber
3,430,523 A * 3/1969 Merritt .................. F16H 1/32
475/159

(Continued)

FOREIGN PATENT DOCUMENTS

CN 202338562 U 7/2012
DE 19830890 A1 1/2000
(Continued)

OTHER PUBLICATIONS

International Search Report dated Jan. 25, 2017, in International Application No. PCT/EP2016/025122 (English-language translation).

(Continued)

*Primary Examiner* — Marcus Charles
(74) *Attorney, Agent, or Firm* — Hunton Andrews Kurth LLP

(57) ABSTRACT

In a thrust washer for the axial securing of rolling elements of a bearing, and a gear mechanism including a thrust washer, the thrust washer is arranged as a circular disk, which has an axially protruding, in particular radially outer, projection. The circular disk has a recess, which is disposed out of center, i.e., the center point of the, e.g., circular recess thus particularly being set apart from the center axis and/or from the center point of the circular disk. The projection may have an annular shape, and the ring axis is set apart from the center point of the, e.g., circular recess.

27 Claims, 12 Drawing Sheets

(51) Int. Cl.
  *F16H 1/32* (2006.01)
  *F16C 19/46* (2006.01)
  *F16H 57/08* (2006.01)
(52) U.S. Cl.
  CPC .......... *F16C 19/463* (2013.01); *F16C 19/543* (2013.01); *F16H 1/32* (2013.01); *F16C 2361/61* (2013.01); *F16H 2001/323* (2013.01); *F16H 2057/085* (2013.01)
(58) Field of Classification Search
  CPC .... F16C 19/547; F16C 2361/61; F16C 33/40; F16C 33/418; F16C 19/187; F16H 1/32; F16H 57/021; F16H 2001/323; F16H 2057/082; F16H 2057/085
  USPC ............... 384/490, 504, 512, 514, 523, 544; 475/162, 170, 245, 247, 325, 348
  See application file for complete search history.

(56) References Cited

U.S. PATENT DOCUMENTS

| | | | |
|---|---|---|---|
| 3,793,907 A * | 2/1974 | Nakamura | F16H 15/50 475/114 |
| 5,368,528 A | 11/1994 | Farrell | |
| 5,433,672 A * | 7/1995 | Tanaka | F16H 1/32 475/178 |
| 6,220,760 B1 | 4/2001 | Ruoff et al. | |
| 6,702,508 B2 | 3/2004 | Simons et al. | |
| 6,824,489 B2 * | 11/2004 | Jacob | F16C 19/182 384/504 |
| 6,957,919 B2 * | 10/2005 | Kern | F16C 19/182 384/504 |
| 7,059,777 B2 * | 6/2006 | Kawaguchi | F16C 19/182 29/898.06 |
| 7,540,819 B1 * | 6/2009 | Jones | F16H 25/06 475/168 |
| 7,553,249 B2 * | 6/2009 | Nohara | F16C 3/08 475/162 |
| 7,686,727 B2 | 3/2010 | Hammill | |
| 8,152,676 B2 * | 4/2012 | Kobayashi | F16H 1/32 475/162 |
| 8,371,759 B2 * | 2/2013 | Fukuda | F16C 19/182 29/898.06 |
| 8,517,879 B2 * | 8/2013 | Misada | F16H 1/32 475/178 |
| 8,545,357 B2 * | 10/2013 | Hibino | F16H 1/32 475/162 |
| 8,840,510 B2 * | 9/2014 | Nomura | F16H 1/32 475/159 |
| 8,858,383 B2 * | 10/2014 | Nishioka | F16H 1/32 475/162 |
| 9,201,055 B2 * | 12/2015 | Ohnuma | G01N 21/251 |
| 2003/0054912 A1 * | 3/2003 | Nohara | F16H 1/32 475/162 |
| 2005/0016321 A1 * | 1/2005 | Watanabe | B65D 90/10 74/519 |
| 2007/0071621 A1 | 3/2007 | Kono et al. | |
| 2008/0166082 A1 * | 7/2008 | Hofmann | F16C 19/38 384/613 |
| 2008/0207377 A1 | 8/2008 | Tsurumi et al. | |
| 2009/0131235 A1 * | 5/2009 | Katsuno | F16C 19/505 483/18 |
| 2009/0178506 A1 | 7/2009 | Yamamoto et al. | |
| 2010/0086248 A1 * | 4/2010 | Yamamoto | F16H 57/021 384/548 |
| 2010/0189386 A1 | 7/2010 | Dizlek et al. | |
| 2011/0222807 A1 | 9/2011 | Tanoue et al. | |
| 2012/0208669 A1 * | 8/2012 | Nakashima | F16C 35/06 475/348 |
| 2012/0308172 A1 * | 12/2012 | Shaikh | F16C 19/182 384/523 |
| 2013/0250303 A1 * | 9/2013 | Shirata | B25J 9/102 356/436 |
| 2015/0307800 A1 | 10/2015 | Yoshida et al. | |
| 2016/0068054 A1 * | 3/2016 | Abe | B60B 27/0015 180/65.51 |
| 2016/0070247 A1 * | 3/2016 | Ohishi | G05B 19/04 700/275 |
| 2017/0335944 A1 * | 11/2017 | Nishimura | F16H 1/32 |

FOREIGN PATENT DOCUMENTS

| | | | |
|---|---|---|---|
| DE | 10027011 A1 | 12/2001 | |
| DE | 102006031956 A1 | 1/2008 | |
| DE | 102008009759 A1 | 10/2008 | |
| DE | 102008019886 A1 | 11/2008 | |
| DE | 102007034813 A1 | 1/2009 | |
| DE | 102010004043 A1 | 9/2010 | |
| DE | 102011086555 A1 | 12/2012 | |
| DE | 102012023809 A1 | 6/2013 | |
| DE | 112013005750 T5 | 9/2015 | |
| EP | 1163984 A1 | 12/2001 | |
| EP | 1225356 A1 | 7/2002 | |
| GB | 2152631 A | 8/1985 | |
| JP | 2004308792 A | 11/2004 | |
| JP | 2015021558 A * | 7/2008 | ............ F16C 35/077 |
| JP | 2015021558 A * | 2/2015 | |
| WO | WO 8503749 A1 | 8/1985 | |
| WO | WO 2013051457 A1 | 4/2013 | |

OTHER PUBLICATIONS

International Preliminary Report on Patentability issued in International Application No. PCT/EP2016/025122, dated May 17, 2018 (8 pages total).

* cited by examiner

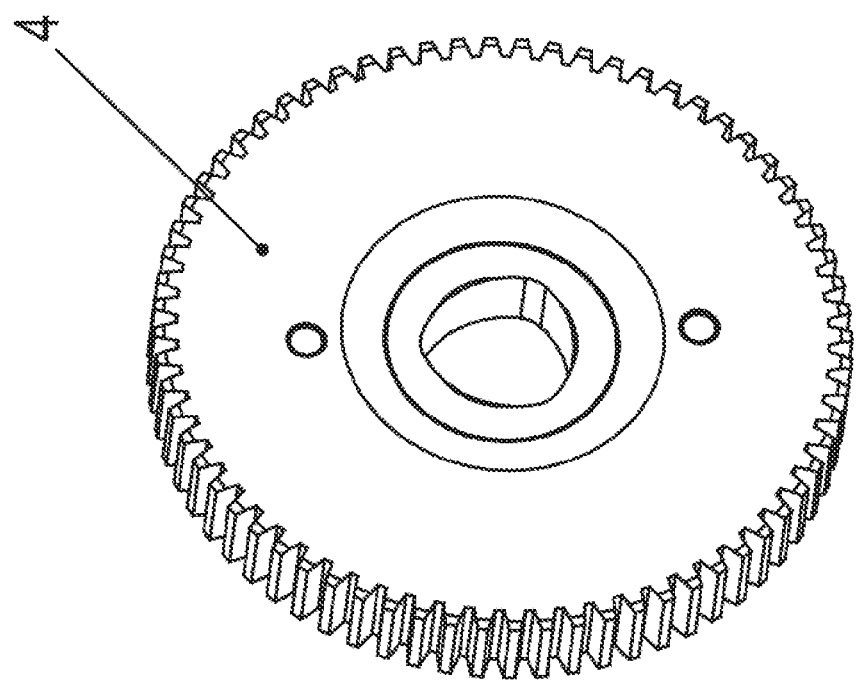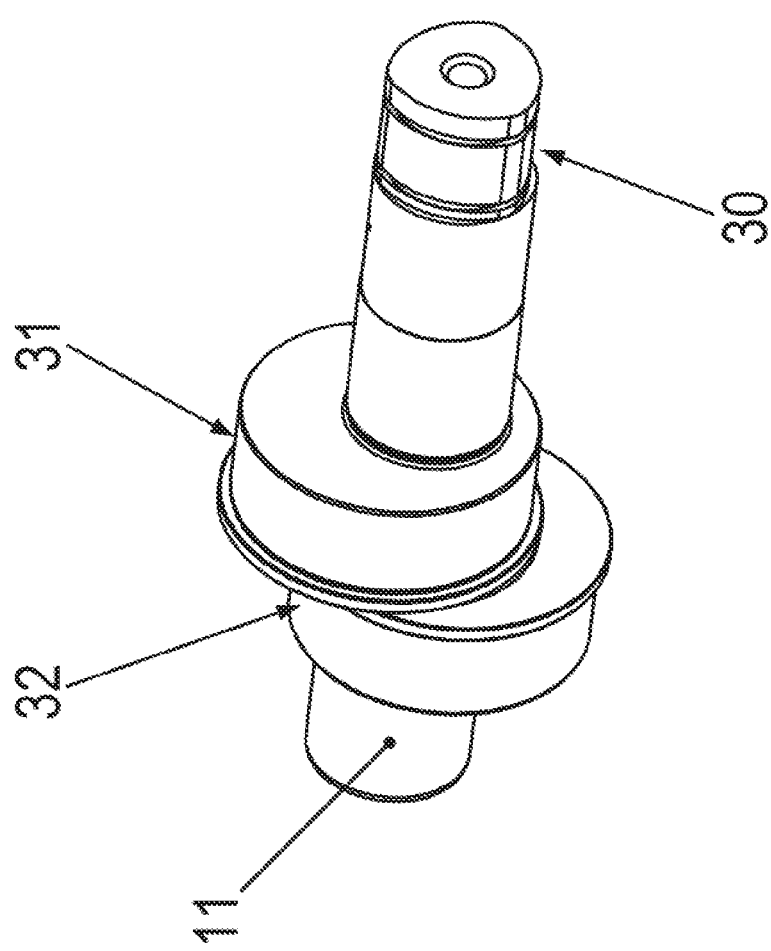
Fig. 3

ANGULAR CONTACT BEARING AND GEAR MECHANISM COMPRISING A THRUST WASHER

FIELD OF THE INVENTION

The present invention relates to an angular contact bearing and a gear mechanism that includes a thrust washer.

BACKGROUND INFORMATION

It is conventional for the production of eccentric shafts of a gear mechanism can be carried out using a cylindrical grinding machine.

An out-of-round shaft-hub connection is described in European Published Patent Application No. 1 225 356.

SUMMARY

Example embodiments of the present invention provide a gear mechanism that is simple, economical, and compact manner and also has a high load-bearing capacity.

According to an example embodiment of the present invention, an angular contact bearing includes rolling elements, in particular balls, as well as an internal ring and an external ring, in particular for mounting a shaft which is rotatably disposed about an axis of rotation. The angular contact bearing has two rows of rolling elements, and the two rows are axially set apart from each other. The centers of gravity of the rolling elements of the first row are situated in a plane whose normal direction is aligned parallel to the axial direction, and the centers of gravity of the rolling elements of the second row are situated in a plane whose normal direction is aligned parallel to the axial direction. The rolling elements of the first row are set apart from one another at regular intervals in the circumferential direction, and the rolling elements of the second row are set apart from one another at regular intervals in the circumferential direction.

This has the advantage of allowing for an uncomplicated production so that a bearing whose internal ring and external ring are beveled can be produced in a cost-effective and simple manner, and recesses are located in the beveled surface to accommodate the rolling elements situated in two rows. High stability with respect to axial forces and/or transverse forces is therefore achievable. This is true even if only balls are used as rolling elements.

According to an example embodiment of the present invention, a gear mechanism includes at least one eccentric shaft, at least one disk having an external toothing, and at least one ring gear, in particular a planet wheel, a sun-gear shaft, and a hollow wheel. The eccentric shaft has an eccentric core region on which the externally toothed disk is rotatably mounted, in particular with the aid of a bearing. The external toothing of the externally toothed disk meshes with the internal toothing of the hollow wheel, which particularly is connected to a housing part of the gear mechanism in a torsionally fixed manner. The eccentric shaft is rotatably mounted in an output shaft, in particular a planet-carrier shaft, and the output shaft is rotatably mounted relative to the hollow wheel with the aid of angular contact bearings. The respective ring gear is connected in a torsionally fixed manner to a/the eccentric shaft, in particular via a polygonal section or with the aid of a spline. Each ring gear meshes with the sun-gear shaft. The external toothing of the externally toothed disk is an involute toothing, and the internal toothing of the internal gear wheel is likewise an involute toothing. One or each angular contact bearing includes rolling elements, in particular balls, and an internal ring and an external ring in each case, in particular for the mounting of an output shaft, which is situated so that it rotates about an axis of rotation. The angular contact bearing has two rows of rolling elements in each case, and the two rows are axially set apart from each other. The centers of gravity of the rolling elements of the first row are disposed in a plane whose normal direction is aligned parallel to the axial direction, and the centers of gravity of the rolling elements of the second row are disposed in a plane whose normal direction is aligned parallel to the axial direction. The rolling elements of the first row are set apart from one another at regular intervals in the circumferential direction, and the rolling elements of the second row are set apart from one another at regular intervals in the circumferential direction.

This has the advantage that the thrust washer is unable to twist and is thus connected to the eccentric shaft in a torsionally fixed manner. This axially secures the rolling elements of the bearing of the externally toothed and eccentrically disposed disk. The angular contact bearings allow for an especially simple production. In addition, very high running smoothness and high stability with respect to transverse forces and/or axial forces are able to be achieved in a two-row bearing assembly. This holds true even if only balls instead of rollers such as cylinder rollers are used as rolling elements.

The output shaft may be arranged as a planet carrier having two side parts, and webs are arranged on a first side part of the planet carrier, and the second side part is connected to the webs by screws such that the angular contact bearings are pretensioned. The first angular contact bearing is braced on the first side part and the second angular contact bearing is braced on the second side part, and the angular contact bearings are disposed in an O-arrangement, in particular. This has the advantage that the pretension for the angular contact bearings can be easily produced during the manufacture, i.e. when the webs are connected to the second side part with the aid of screws.

The gear mechanism may include a thrust washer, which is slipped onto the eccentric shaft for the axial restriction of the rolling elements of the bearing of the externally toothed disk, the thrust washer in particular being slipped onto a centrical region of the eccentric shaft, i.e. in particular a region of the eccentric shaft that is axially symmetrical to the axis of the eccentric shaft. A projection arranged on the thrust washer covers an edge, in particular a margin, of the eccentric core region, especially such that the thrust washer is connected to the eccentric shaft by a keyed connection and/or by a torsionally fixed connection.

The thrust washer may be provided for the axial securing of rolling bodies of a bearing, in particular of a cylindrical-roller bearing, and the thrust washer may be arranged in the form of a circular disk, which includes an axially protruding, in particular radially outer, projection. The circular disk has a recess which is disposed out of center, i.e. the center point of the preferably circular recess in particular is set apart from the center axis and/or from the center point of the circular disk, and the projection is particularly arranged in an annular shape, and the ring axis is set apart from the center point of the preferably circular recess.

This is advantageous since the out-of-center circular recess allows for a torsionally fixed and simple connection to an eccentric shaft inasmuch as the bearing is disposed in an eccentric manner, i.e. on an eccentric core region of the shaft. However, a centrical placement of the recess with respect to the axis of rotation of the eccentric shaft is also possible. As a result, a torsionally fixed connection is able to be produced between the thrust washer and the eccentric shaft with the aid of an axial projection on the thrust washer.

The thrust washer may be arranged as a circular disk, which has an axially protruding, in particular radially outer, projection, and the circular disk may have a recess that is disposed out of center, i.e. the center point of the preferably circular recess is set apart from the center axis and/or from the center point of the circular disk, in particular. The projection particularly has an annular shape, and the ring axis is set apart from the center point of the preferably circular recess. This is considered advantageous insofar as an unambiguous fixation of the thrust washer is implemented with the aid of the projection in conjunction with the recess which is disposed out of center on the thrust washer. A torsionally fixed connection to the eccentric shaft is therefore able to be achieved in a simple and cost-effective manner.

The axial region covered by the eccentric core region may encompass the axial region covered by the projection, and/or the axial region covered by the thrust washer may overlap, especially genuinely overlaps, with the axial region covered by the eccentric core region. This has the advantage that the projection is slipped over the circumferential edge of the cylindrical eccentric core region from the direction of the thrust washer. An uncomplicated, non-positive connection is therefore able to be produced, which results in a playfree and torsionally fixed connection to the eccentric shaft.

The projection may be connected to the eccentric core region in a non-positive manner, and especially may be elastically pressed onto this region in the radial direction. This has the advantage of allowing for a playfree and torsionally fixed connection that is easy to establish.

In the gear mechanism having at least one eccentric shaft, at least one externally toothed disk and at least one ring gear, in particular a planet gear, the eccentric shaft may include an eccentric core region on which the externally toothed disk is rotatably mounted, especially with the aid of a bearing, and the eccentric shaft may have an out-of-round section on which the ring gear is connected to the eccentric shaft in a torsionally fixed manner.

This has the advantage that a high torque is able to be transmitted in a small space region since the ring gear is connected to the eccentric shaft via the polygonal connection that has a particularly high loading capacity. Especially in comparison with a feather-key connection, the polygonal shaft-hub connection between the ring gear and the eccentric shaft transmits a very high torque. In addition, the production is easy and economical because the machine tool, especially the grinding machine, that can be used for producing the eccentric core regions is also able to be employed for the production of the out-of-round region. The grinding process can therefore be carried out without an additional clamping setup and alignment.

The eccentric core region may be a regular cylindrical section which is disposed parallel to but at a distance from, and thus especially not coaxially with, the center axis of the eccentric shaft and/or the ring gear. This is considered advantageous because the eccentric core region is disposed out of center with respect to the shaft axis of the eccentric shaft. The same machine that may machine the out-of-round region is thus able to be utilized for the grinding process.

The out-of round section may be axially set apart from the eccentric core region, which is considered advantageous inasmuch as only an axial shift is required for the machining of the regions.

The out-of-round section may have a hypotrochoidal form, i.e. is shaped in the form of a hypotrochoid, in particular, or is made up of hypotrochoidal sections. This is has the advantageous of allowing for the selection of a shaft-hub connection that has a particularly high load-bearing capacity.

The ring gear may include a recess whose shape matches the shape of the out-of-round section, in particular such that the ring gear is connected to the eccentric shaft in a torsionally fixed and playfree manner with the aid of the out-of round section. This is considered advantageous because the ring gear is placed over the eccentric shaft, in particular thermally shrunk-fit onto the eccentric shaft, so that a playfree and torsionally fixed connection is able to be established.

The external toothing of the disk may mesh with a hollow wheel, in particular with a housing-forming hollow wheel. This has the advantage that no rollers or disc cams are required but involute toothed disks may be utilized. An exact and precise rolling of the disk at the circumference of the hollow wheel is therefore possible.

The external toothing may be arranged as an involute tooth system, which offers the advantage of allowing for a simple and precise manufacture.

The eccentric shaft may include a second eccentric core region, which is axially set apart from the first eccentric core region and has an offset of 180° in the circumferential direction, the eccentric core regions particularly being arranged in the same shape, which has the advantage of allowing for a balanced movement.

The eccentric shaft may be rotatably mounted and accommodated in an output shaft of the gear mechanism, the axis of the eccentric shaft particularly being disposed parallel to and at a distance from the axis of the output shaft. This is considered advantageous insofar as torque can be transferred to the output shaft in an uncomplicated manner.

The output shaft may be rotatably mounted in the hollow wheel with the aid of at least one angular contact bearing. This is considered advantageous since it allows for a stable arrangement.

The ring gear may mesh with a sun-gear toothing which is disposed coaxially to the output shaft, in particular, the ring gear, the sun-gear toothing, and at least one further ring gear forming a spur-gear distribution gear stage. This has the advantage of providing an additional translation stage in the distribution of the torque from the sun to a plurality of ring gears.

The sun-gear toothing may be situated in a torsionally fixed and coaxial manner with respect to a toothed wheel that meshes with a toothed component, in particular a pinion, which is directly driven by an electric motor or driven via a coupling. This offers the advantage that a primary stage featuring a suitable translation is disposed upstream.

The eccentric shaft may include a second eccentric core region on which a second disk, having an external toothing, of the gear mechanism is mounted in a rotatable manner, the external toothing of the second disk meshing with the internal toothing of the hollow wheel. This has the advantage of allowing for a balanced movement.

According to an example embodiment of the present invention, a gear mechanism includes at least one eccentric shaft, at least one externally toothed disk, and at least one ring gear, in particular a planet gear, a sun-gear shaft, and a hollow wheel. The eccentric shaft has an eccentric core region on which the externally toothed disk is mounted in a rotatable manner, in particular with the aid of a bearing. The external toothing of the externally toothed disk meshes with the internal toothing of the hollow wheel, which particularly is connected to a housing part of the gear mechanism in a torsionally fixed manner. The eccentric shaft is rotatably mounted in an output shaft, in particular a planet-carrier shaft, and the output shaft is rotatably mounted with respect to the hollow wheel. The respective ring gear is connected to a/the eccentric shaft in a torsionally fixed manner in each case, in particular with the aid of a polygonal section or a spline, and each ring gear meshes with the sun-gear shaft. The external toothing of the externally toothed disk is an involute tooth system, and the internal toothing of the hollow wheel is also an involute tooth system.

This has the advantage of allowing for the use of an involute tooth system, which makes it easy to produce the external tooth meshing because simple production machines are able to be employed for the production. The use of two disks on each eccentric shaft, which are disposed at an offset of 180°, makes it possible to reduce the imbalance of the gear mechanism and thus also the loading of the meshing involute tooth systems of the hollow wheel and the disks. Preferably, three eccentric shafts are disposed at regular intervals in the circumferential direction and are rotatably mounted in the output shaft in each case. The eccentric shafts are connected to a planet gear in a torsionally fixed manner, and all planet gears are connected to a sun-gear shaft in a torsionally fixed manner. The sun-gear shaft is thus able to be used as an input shaft and forms a spur-gear distribution stage together with the planet gears. The gear mechanism is therefore easy to produce and is low in vibrations.

All of the aforementioned arrangements are able to be used in this gear mechanism. The thrust washer, in particular, forms a cost-effective and simple, yet extremely effective axial retaining mechanism of the bearing of the externally toothed disks.

Further features and aspects of example embodiments of the present invention are described in greater detail below with reference to the Figures.

BRIEF DESCRIPTION OF THE DRAWINGS

FIG. 3 shows an exploded view of an eccentric shaft 11 and a planet gear 4 that is connected to the shaft.

DETAILED DESCRIPTION

Figure 1:
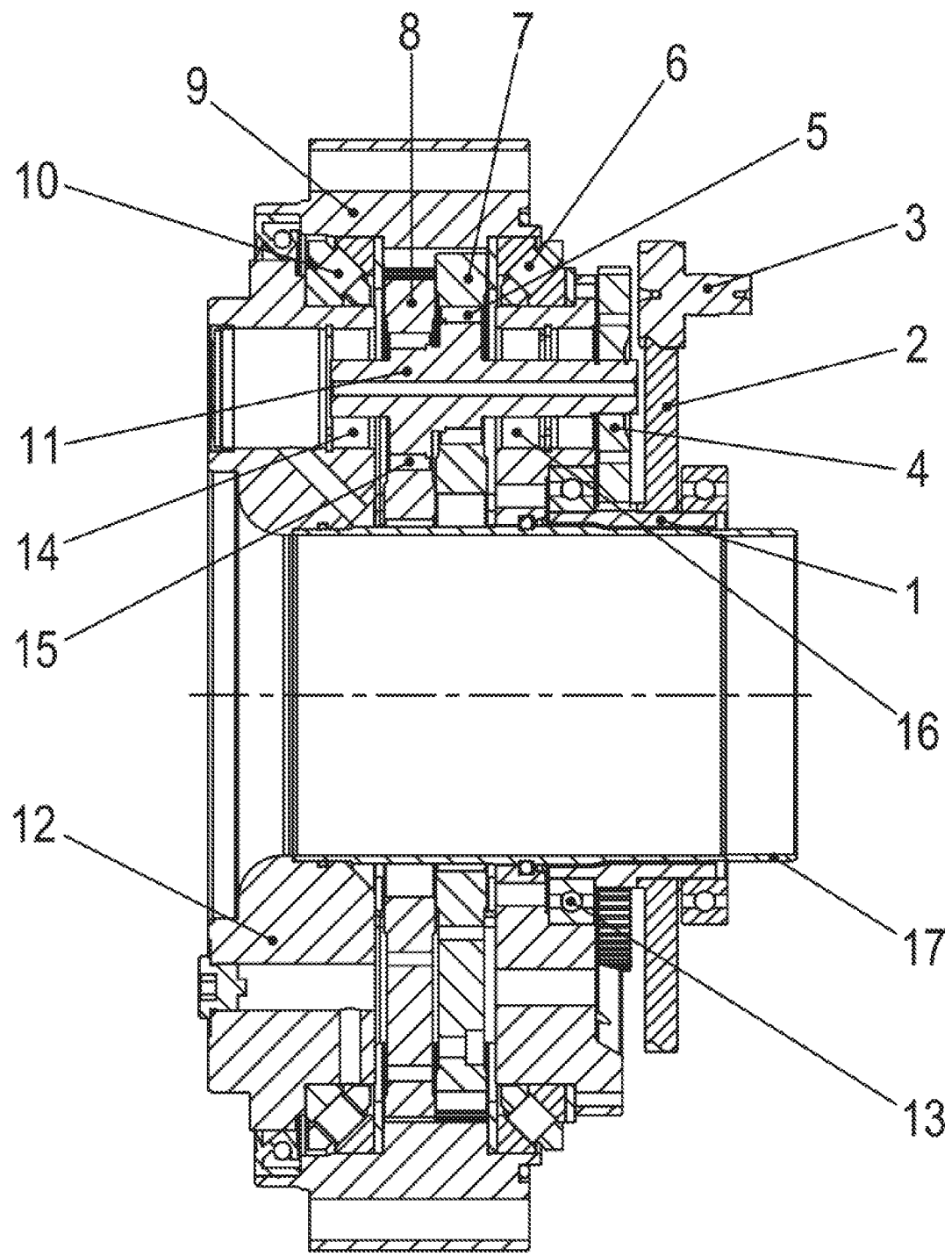
FIG. 1 shows a cross-section through a gear mechanism with eccentric shafts 11 according to an example embodiment of the present invention.
Figure 2:
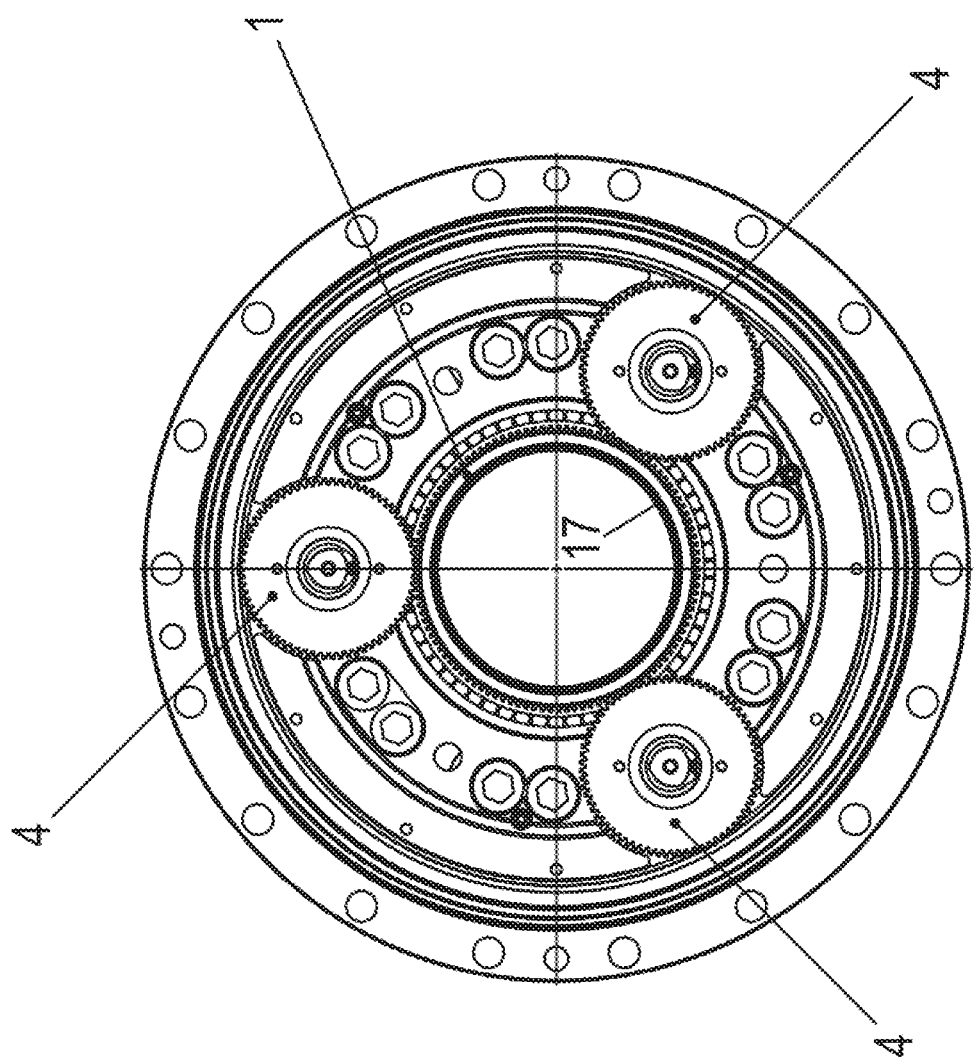
FIG. 2 shows an associated longitudinal view.
Figure 4:
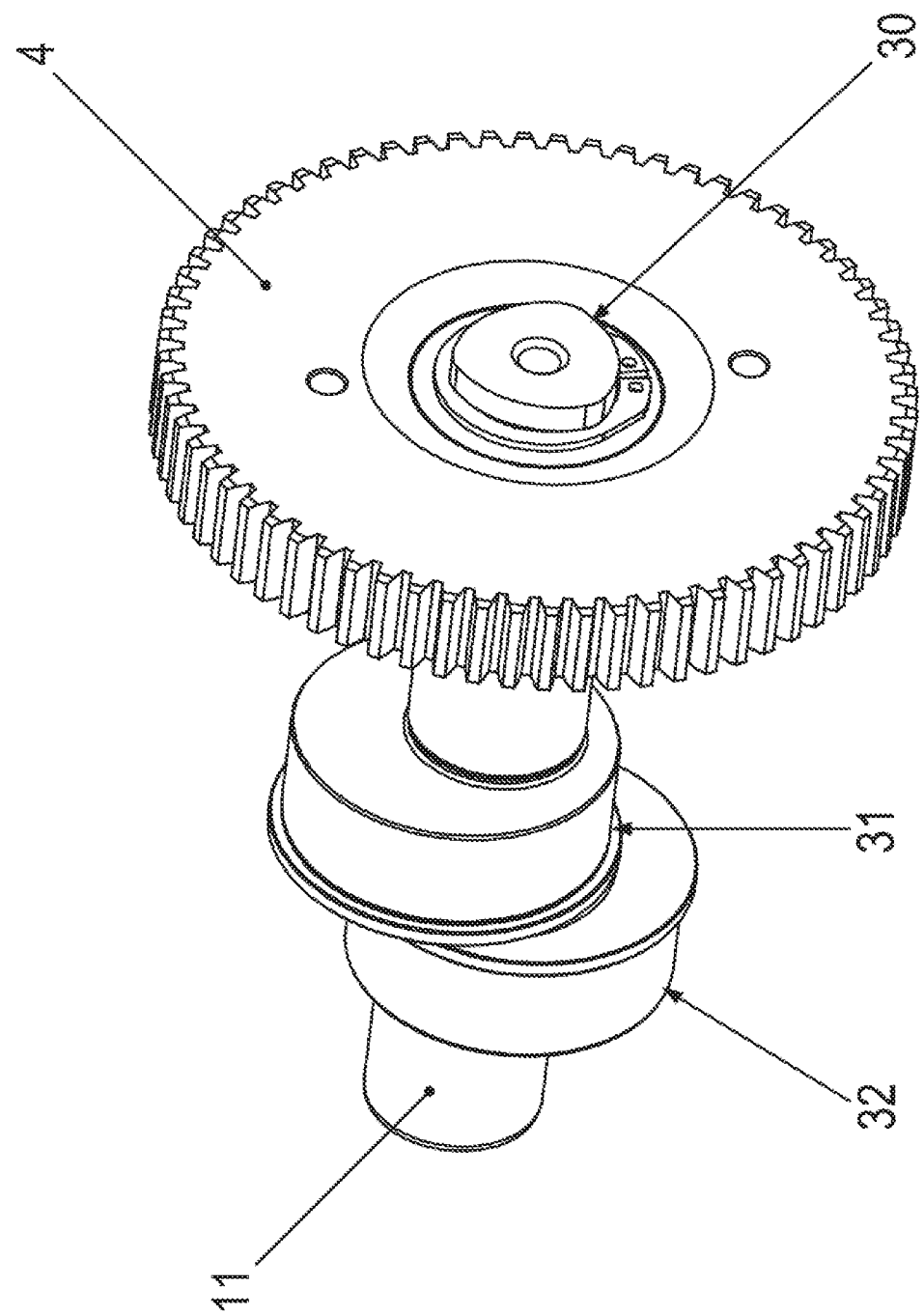
FIG. 4 shows the non-exploded illustration that is associated with FIG. 3.
Figure 5:
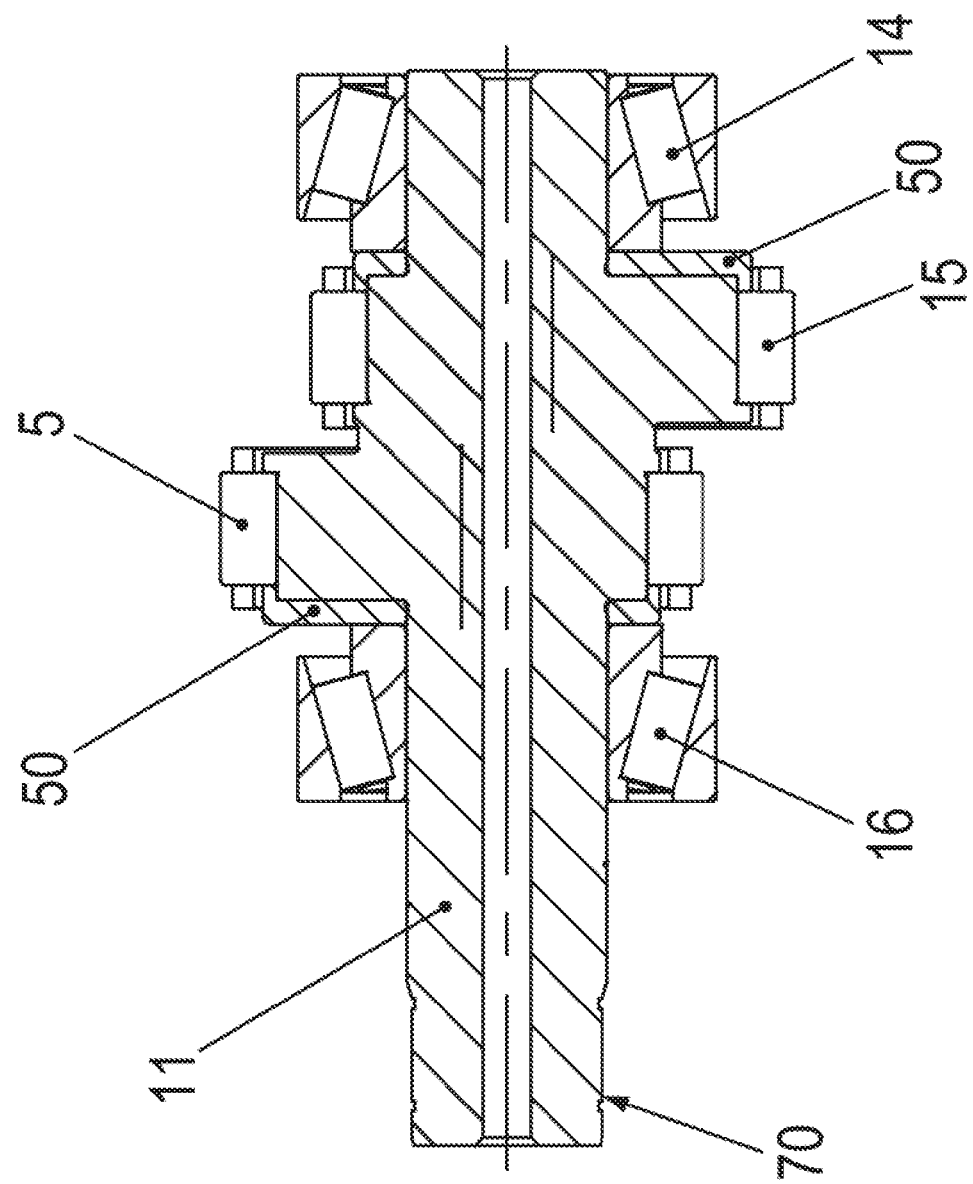
FIG. 5 shows a cross-section through an eccentric shaft 11 together with the bearings (14, 15, 5, 16) and two thrust washers 50 for the rolling elements of bearings 5 and 15, the shaft being provided with a spline section instead of a polygonal connection section.
Figure 6:
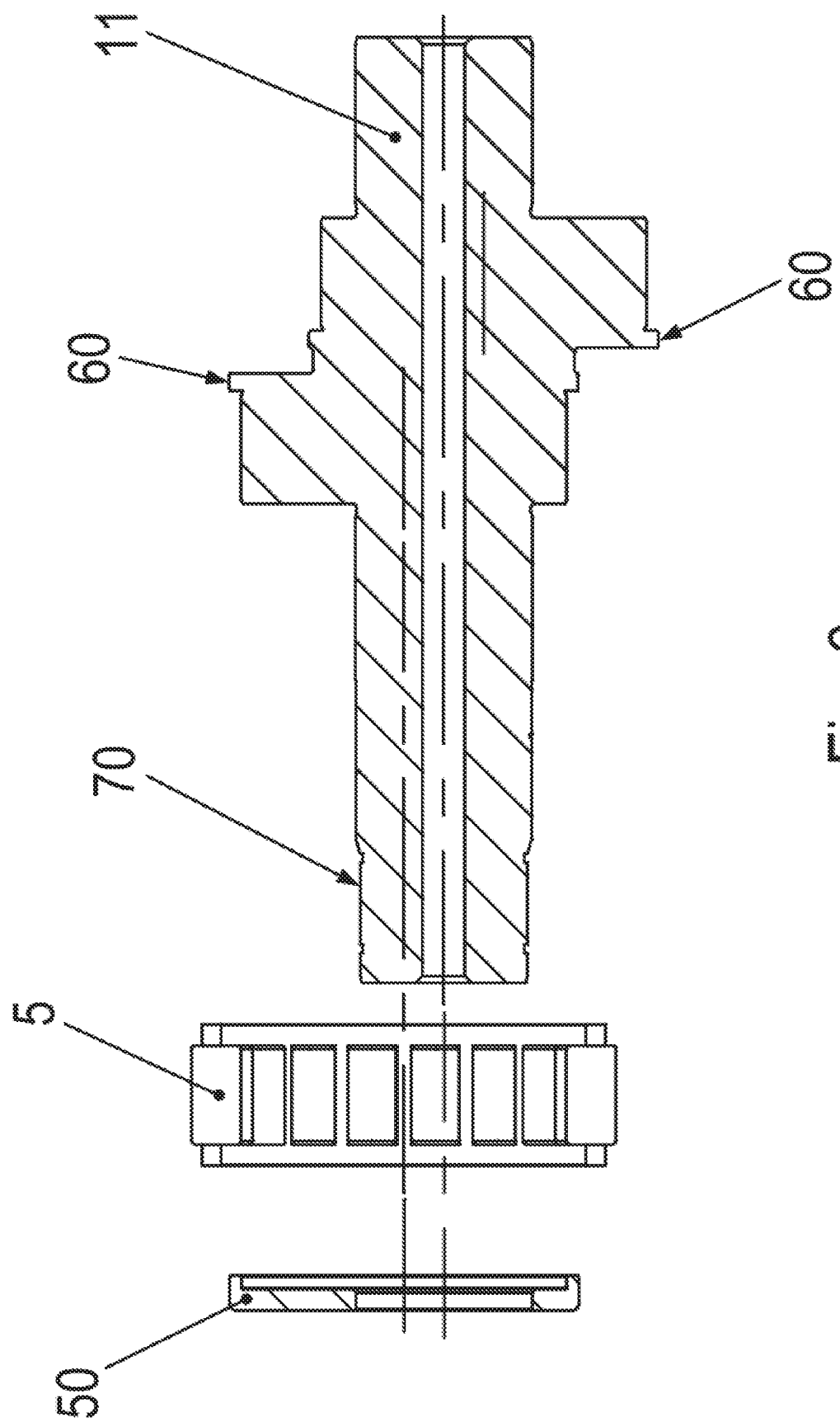
FIG. 6 shows an exploded view of eccentric shaft 11, bearing 5, and thrust washer 50.
Figure 7:
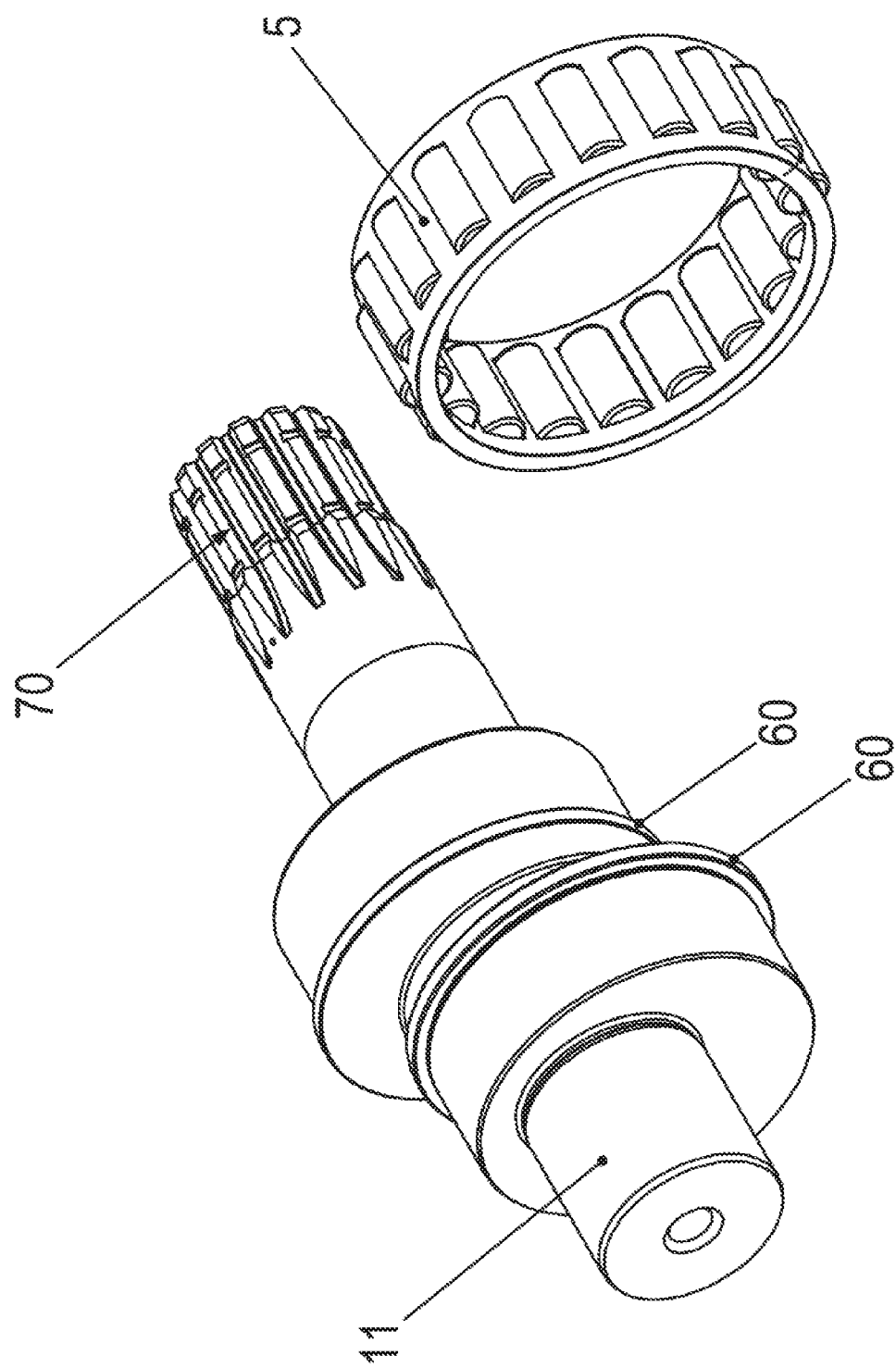
FIG. 7 shows the eccentric shaft and bearing 5 in an exploded and an oblique view.
Figure 8:
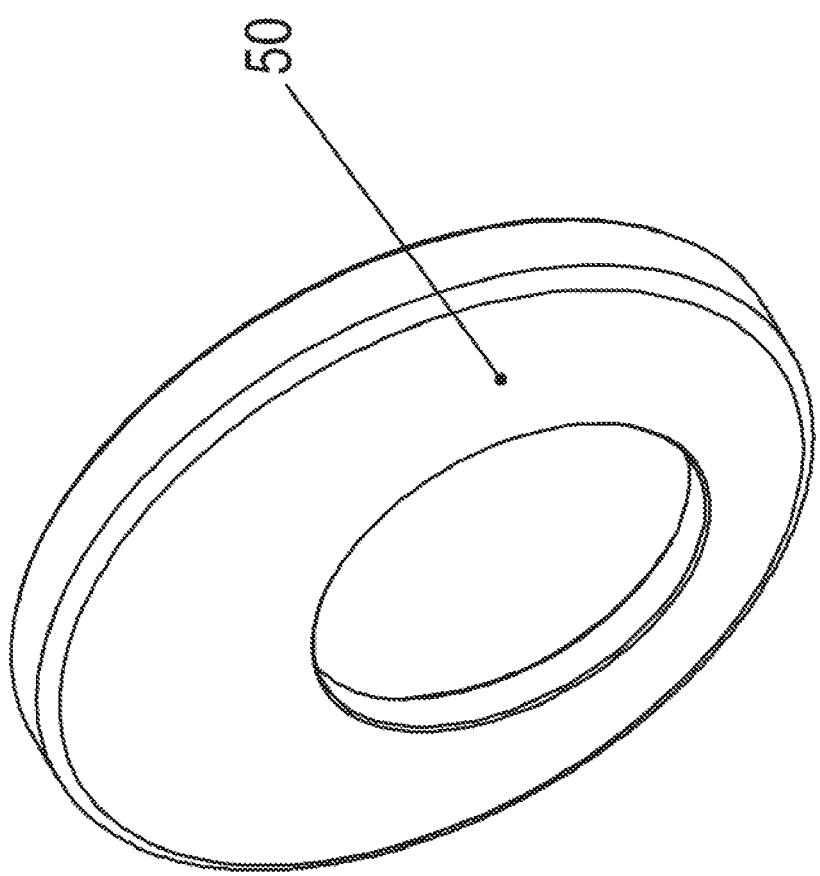
FIG. 8 shows thrust washer 50 in an oblique view in a first viewing direction.
Figure 9:
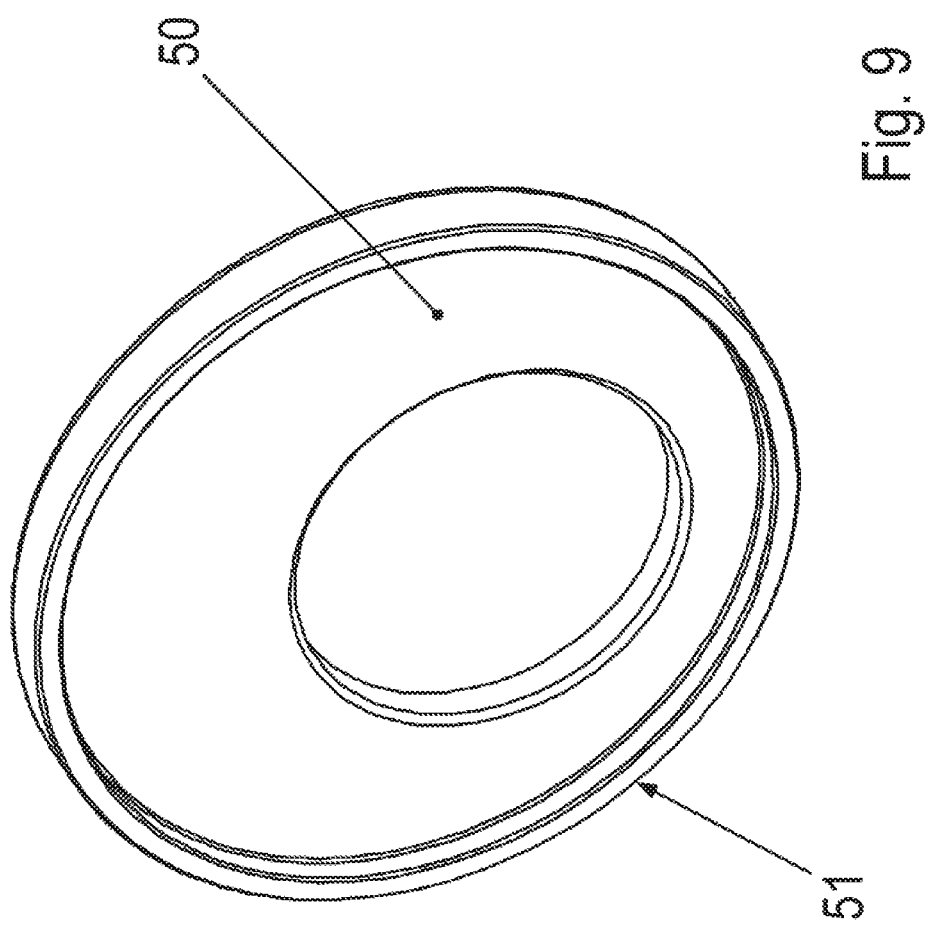
FIG. 9 shows thrust washer 50 in an oblique representation in another viewing direction.

As illustrated in the Figures, the input shaft drives a pinion 3, which meshes with a toothed wheel 2.

Toothed wheel 2 is connected in a torsionally fixed manner to a sun-gear shaft 1, which has a sun-gear toothing or is connected to a sun gear in a torsionally fixed manner.

Three planet gears 4, each being connected to an eccentric shaft 11 in a torsionally fixed manner, mesh with the sun-gear toothing. The sun-gear toothing therefore forms a spur-gear distribution gear stage together with planet gears 4.

For the torsionally fixed connection of respective planet gear 4 to the individual eccentric shaft 11, eccentric shaft 11 includes an axial section that is arranged in a polygonal shape. The polygon may be shaped according to a hypotrochoid. Planet wheel 4 has a correspondingly shaped inner-polygonal recess and is placed on top of eccentric shaft 11, in particular thermally shrunk-fit onto the shaft. As a result, a torsionally fixed and playfree connection is readily provided between the respective planet wheel 4 and respective eccentric shaft 11.

The polygonal outer contour of eccentric shaft 11 is able to be produced without any significant work because the eccentric shaft includes two axial sections that are set apart from the axial section and are arranged as an eccentric core region (31, 32) in each case. Each eccentric core region has a cylindrical external surface for this purpose; however, the cylinder axis is set apart from the center axis of eccentric shaft 11, the cylinder axis being aligned parallel to the center axis.

Eccentric core regions 31, 32 are axially spaced apart from one another or, at most, are at least disposed so as to touch each other, and have an offset of 180° in the circumferential direction; in all other respects, eccentric core regions 11 are arranged in the same manner.

As a result, eccentric core regions 31 and 32 and the polygonal section are able to be produced using one and the same machine tool, i.e., using a single clamping, which means that no special additional effort is required to produce the polygonal outer contour.

A bearing 5, which is accommodated in a bore hole that is situated centrically on a first externally toothed disk 7, is placed onto first eccentric core region 31. First disk 7 is thus rotatably mounted on eccentric core region 31. The external toothing of disk 7 is arranged in the form of an involute tooth system and is meshing with the internal toothing of a hollow wheel 9 that is connected to the housing or forms a housing. The internal toothing of hollow wheel 9 is also arranged as an involute tooth system.

A bearing 5, which is accommodated in a bore hole that is situated centrically on a second externally toothed disk 8 is placed onto second eccentric core region 32. Second disk 8 is thus rotatably mounted on second eccentric core region 32. The external toothing of second disk 8 is arranged in the form of an involute tooth system and is also meshing with the internal toothing of hollow wheel 9.

The internal toothing of hollow wheel 9 extends across such a wide axial region that it covers the two axial regions that are covered by the external toothings of the first and second disk 7, 8.

Eccentric shafts 11 are rotatably mounted in output shaft 12, and the bearing seats of the bearings that support eccentric shafts 11 are radially set apart from the center axis of output shaft 12.

Output shaft 12 is situated coaxially with respect to sun-gear shaft 1.

Output shaft 12 is mounted in hollow wheel 9 with the aid of angular contact bearing 10.

As illustrated in FIGS. 5 through 9, eccentric shaft 11 is also able to be provided with a spline 70 instead of a polygonal contour. In other words, the accommodated toothed wheel is connected using a splined connection, in particular by a keyed connection.

Bearing 5 which is slipped onto first eccentric core region 31 mounts first disk 7, and bearing 15 which is slipped onto second eccentric core region 32 mounts second disk 8.

With the aid of bearings 14 and 16, eccentric shaft 11 is mounted on both sides of eccentric core regions 31 and 32. Bearing 14 is accommodated in output shaft 12.

Thrust washers 50 are disposed on eccentric core regions 31 and 32; they have a circumferential and axially protruding projection 51 in the circumferential direction, which creates an axial restriction and fixation of the rolling elements of bearing 5.

Thrust washer 50 has a non-centrical hole through which a section of eccentric shaft 11 is guided. Projection 51, which is slipped over the edge of the respective eccentric core region (31, 32), thus forms an anti-rotation device for thrust washer 50. Thrust washer 50 is therefore provided in the form of a keyed, and consequently a torsionally fixed connection, with eccentric shaft 11 in the circumferential direction. Projection 51 simultaneously acts as an axial restriction of the rolling elements.

In addition, eccentric core region 31 includes a thrust flange 60, which has a larger radial extension than the remaining area of eccentric core region 31 arranged as a bearing seat for bearing 5. Since bearing 5 is situated axially between thrust flange 60 and first thrust washer 50 with its projection 51, it is axially secured on both sides.

Thrust flange 60 is formed in one piece, i.e., as one part, on eccentric shaft 11, in particular on eccentric core region 31.

A second thrust washer 50 is likewise provided for the axial securing of bearing 15, and thus also of the rolling elements of bearing 15; the second thrust disk 50 is slipped onto second eccentric core region 32, and the projection of the second thrust disk axially restricts the rolling elements of bearing 15.

In addition, eccentric core region 32 includes a further thrust flange 60, which has a larger radial extension than the remaining area of eccentric core region 32 arranged as a bearing seat for bearing 15. Since bearing 15 is disposed axially between further thrust flange 60 and first thrust washer 50 with its projection 51, it is axially secured on both sides.

Thrust flange 60 is formed in one piece, i.e., as one part, on eccentric shaft 11, in particular on eccentric core region 32.

Respective thrust washer 50 is produced from steel, in particular from a sheet steel.

The two thrust flanges 60 are therefore arranged coaxially with respect to the particular eccentric core region (31, 32), and the eccentric core regions (31, 32) are situated out of center, i.e., eccentrically, with respect to the axis of rotation of eccentric shaft 11.

A hollow pipe 17, which restricts and thus holds the lubricating oil in the interior of the gear mechanism, is connected to output shaft 12 in a torsionally fixed manner. Hollow pipe 17 is situated radially within sun-gear shaft 1 and radially at a distance from disks 7 and 8.

With the aid of the involute tooth systems of disks 7 and 8 as well as hollow wheel 9, simple bracing on the stationary part, i.e., the part that may also be used as a housing part, or thus also on a housing part that is connected to hollow wheel 9, is able to be implemented in a simple and cost-effective manner.

Figure 10:
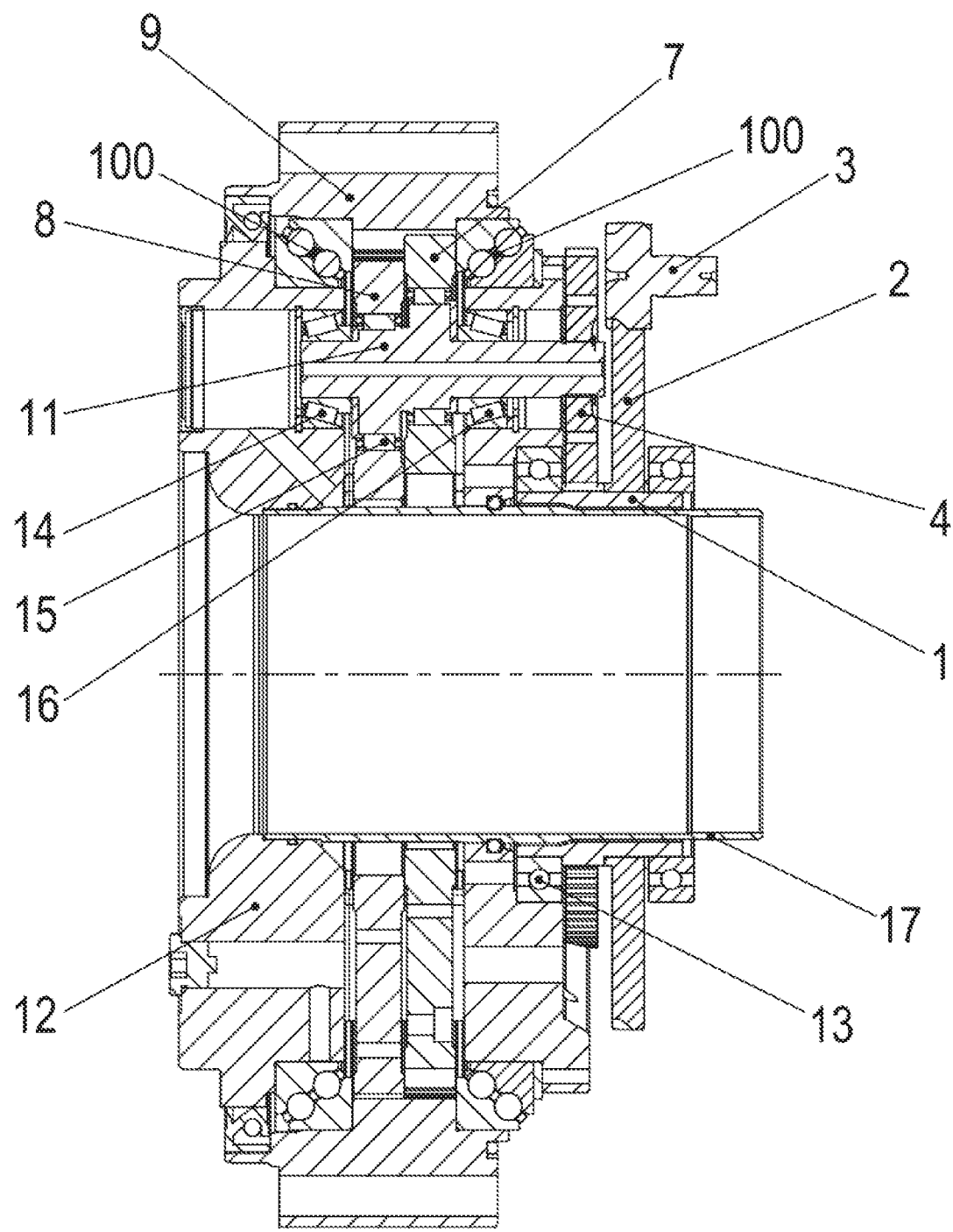
FIG. 10 shows the gear mechanism according with double-row angular contact bearings 100 in an O-arrangement instead of bearings 10 and 6.

As illustrated in FIG. 10, angular contact bearings 6 and 10 are able to be replaced by two other angular contact bearings 100, which are aligned in an O-arrangement with respect to each other.

The internal ring of bearing 100, which replaces bearing 10, is positioned against a step of output shaft 12, in particular a first side part of output shaft 12, which is implemented as a planet-gear carrier having two side pieces, and the external ring of bearing 100, which replaces bearing 10, is positioned against a step of hollow wheel 9. Output shaft 12 has a precisely machined bearing seat for the internal ring of bearing 100, which replaces bearing 10, and the hollow wheel has a precisely machined bearing seat for the external ring of bearing 100, which replaces bearing 6. As a result, bearing 100, which replaces bearing 10 is braced against the first side piece of output shaft 12. Bearing 100, which replaces bearing 6 is braced against the second side piece.

This output shaft 12 is arranged as a planet-gear carrier having two side pieces, and axially extending webs are formed in one piece i.e., as one part, on a first side piece, onto which the second side piece of the planetary-gear carrier is placed and connected with the aid of screws. The second side piece is pressed in the axial direction in the direction of the first side piece. Interposed bearings 100 are thereby prestressed, particularly prestressed in the axial direction.

Internal ring 112 of bearing 100, which replaces bearing 6, is positioned against a step of the second side piece of planet-gear carrier 12 and accommodated in a precisely machined bearing seat of the second side piece. The external ring of bearing 100, which replaces bearing 6, is positioned against a step of hollow wheel 9 and is accommodated in a precisely machined bearing seat of hollow wheel 9.

When screw-fitting the second side piece with the webs that are formed in one piece on the first side piece, i.e., in one part, pretension is therefore induced on bearings 100 disposed in the O-arrangement.

Figure 11:
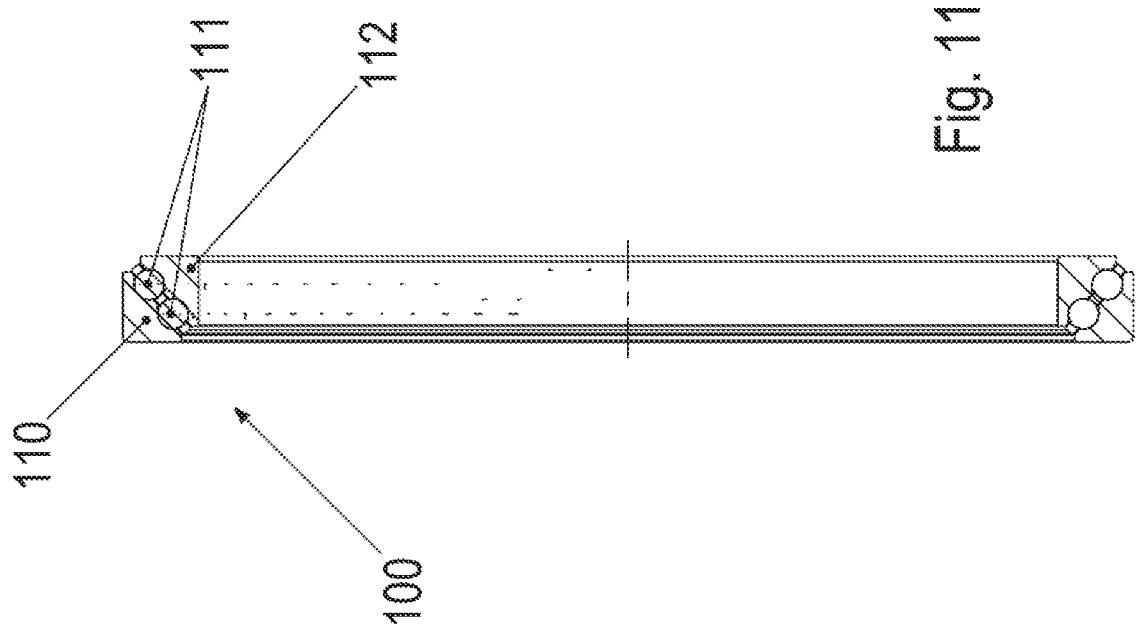
FIG. 11 shows one of angular contact bearings 100 in a cross-sectional view.
Figure 12:
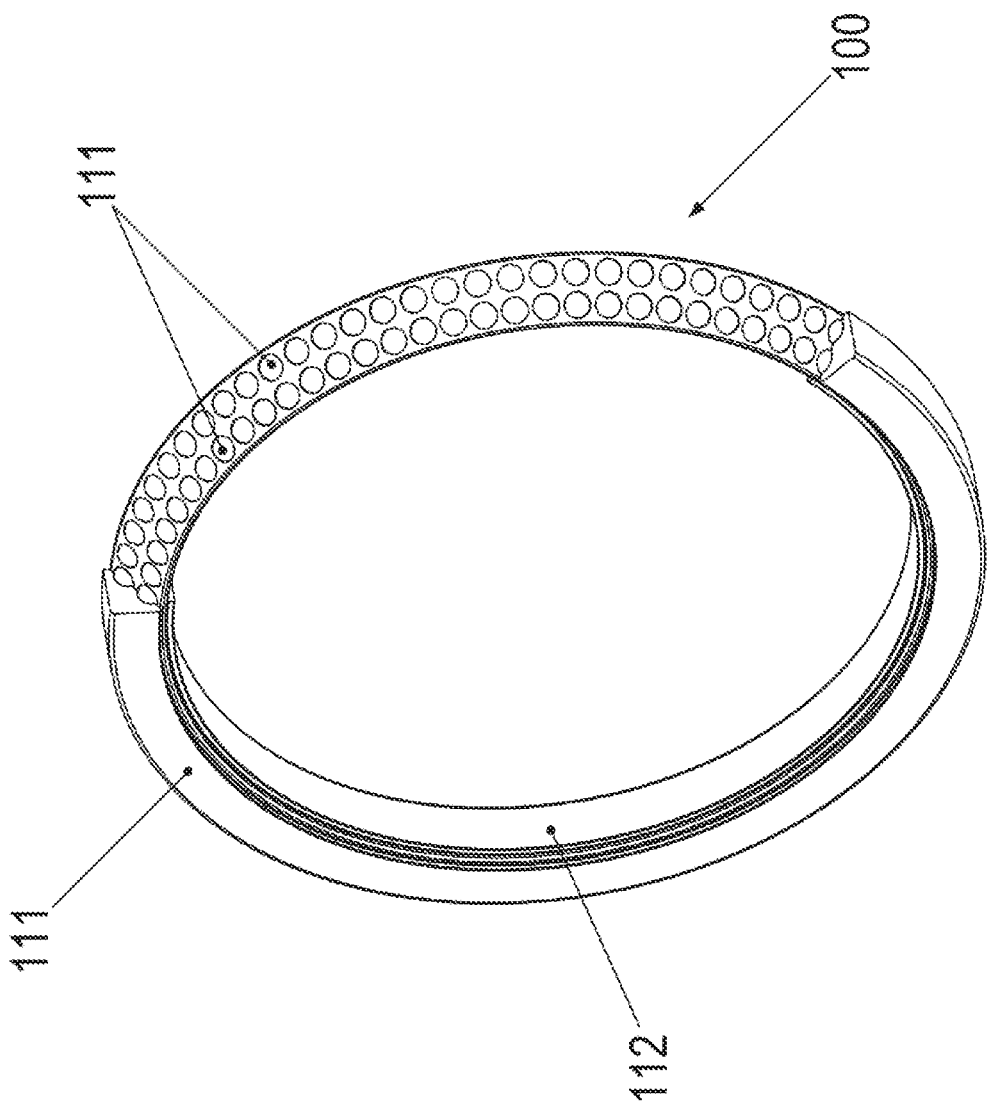
FIG. 12 shows angular contact bearing 100 partially cut and in an oblique view.

As illustrated in FIGS. 11 and 12, the angular contact bearing has two rows of balls that are situated axially apart from each other. Each row of balls is situated in a circle, and the normal direction of the plane including the circle is aligned in the axial direction.

The number of rolling elements 111, i.e., especially balls, of the first row of balls equals the number of rolling elements 111 of the second row of balls.

The balls of each row of balls are disposed in the same axial position and are set apart from each other at regular intervals in the circumferential direction.

The first row of balls covers a smaller radial-distance region than the second row of balls. As a result, the first row of balls has a smaller radial extension than the second row of balls.

The first row of balls has a smaller axial distance from the other angular contact bearing than the second row of balls.

With the aid of angular contact bearings 100, a particularly easy production is able to be carried out.

LIST OF REFERENCE NUMERALS

1 Sun-gear shaft
2 Toothed wheel
3 Pinion
4 Planet wheel
5 Bearing
6 Angular contact bearing
7 First externally toothed disk
8 Second externally toothed disk
9 Hollow wheel
10 Angular contact bearing
11 Eccentric shaft
12 Output shaft
13 Bearing
14 Bearing for eccentric shaft 11
15 Bearing for second disk 8 for the mounting on eccentric shaft 11
16 Bearing for the eccentric shaft for the rotatable mounting with respect to the sun-gear toothing
17 Pipe
30 Polygonal sections of eccentric shaft 11
31 First eccentric core region
32 Second eccentric core region
50 Thrust washer
60 Thrust flange
51 Circumferential axial projection
70 Spline
100 Double-row angular ball bearing
110 External ring
111 Rolling element, in particular ball
112 Internal ring

The invention claimed is:

1. An angular contact bearing, comprising:
an internal ring;
an external ring; and
two rows of rolling elements axially set apart from each other, centers of gravity of the rolling elements of a first row being arranged in a plane having a normal direction aligned parallel to an axial direction, centers of gravity of the rolling elements of a second row arranged in a plane having a normal direction aligned parallel to the axial direction, the rolling elements of the first row being set apart from one another at regular intervals in a circumferential direction, and the rolling elements of the second row being set apart from one another at regular intervals in the circumferential direction;
wherein the first row of rolling elements and the second row of rolling elements include an equal number of rolling elements.

2. The angular contact bearing according to claim 1, wherein the rolling elements include balls.

3. The angular contact bearing according to claim 1, wherein the rolling elements of the first row are arranged at a different radial distance than the rolling elements of the second row.

4. The angular contact bearing according to claim 1, wherein the rolling elements of the first row and the rolling elements of the second row are aligned in the circumferential direction.

5. A gear mechanism, comprising:
at least one eccentric shaft;
at least one externally toothed disk; and
at least one ring gear including a planet wheel, a sun-gear shaft, and a hollow wheel;
wherein the eccentric shaft includes an eccentric core region on which the externally toothed disk is rotatably mounted and/or with the aid of a bearing, an external toothing of the externally toothed disk meshing with an internal toothing of the hollow wheel, which is connected in a torsionally fixed manner to a housing part of the gear mechanism, the eccentric shaft rotatably mounted in an output shaft, the output shaft rotatably mounted with respect to the hollow wheel with the aid of angular contact bearings, the ring gear is connected to the eccentric shaft in a torsionally fixed manner, with the aid of a polygonal section, and/or with the aid of a spline, each ring gear meshing with the sun-gear shaft, the external toothing of the externally toothed disk arranged as an involute tooth system, and the internal toothing of the hollow wheel arranged as an involute tooth system; and
wherein the angular contact bearings include an internal ring, an external ring, and two rows of rolling elements axially set apart from each other, centers of gravity of the rolling elements of a first row being arranged in a plane having a normal direction aligned parallel to an axial direction, centers of gravity of the rolling elements of a second row arranged in a plane having a normal direction aligned parallel to the axial direction, the rolling elements of the first row being set apart from one another at regular intervals in a circumferential direction, and the rolling elements of the second row being set apart from one another at regular intervals in the circumferential direction.

6. The gear mechanism according to claim 5, wherein the rolling elements include balls.

7. The gear mechanism according to claim 5, wherein the output shaft is arranged as a planet-gear carrier having two side pieces, webs being provided on a first side piece of the planet-gear carrier, a second side piece being connected to the webs with the aid of screws such that the angular contact bearings are pretensioned, a first angular contact bearing being braced on the first side piece, a second angular contact bearing being braced on the second side piece, the angular contact arranged in an O-arrangement.

8. The gear mechanism according to claim 5, wherein a thrust washer is provided on the eccentric shaft to axially restrict the rolling elements of the bearing of the externally toothed disk, the thrust washer being provided in a centrical region of the eccentric shaft and/or a region of the eccentric shaft that is in rotational symmetry with respect to an axis of the eccentric shaft, a projection provided on the thrust washer covering an edge and/or a margin of the eccentric core region such that the thrust washer is connected to the eccentric shaft, whose axis of rotation extends centrally through the circular disk, via a keyed connection and/or in a torsionally fixed manner, in at least in the circumferential direction.

9. The gear mechanism according to claim 8, wherein the thrust washer is secured against twisting, the thrust washer arranged as a circular disk having an axially protruding, radially outer projection, the circular disk having a recess disposed out of center, a center point of the recess being set apart from a center axis and/or from a center point of the circular disk such that the thrust washer connectable via a keyed connection and/or in a torsionally fixed manner, at least in the circumferential direction, to an eccentric shaft whose axis of rotation extends centrally through the circular disk, the projection having an annular shape and the ring axis set apart from the center point of the recess.

10. The gear mechanism according to claim 8, wherein the thrust washer is arranged as a circular disk having an axially protruding, radially outer projection.

11. The gear mechanism according to claim 9, wherein the circular disk has a recess disposed out of center, a center point of the recess being set apart from the center axis and/or from the center point of the circular disk, the projection having an annular shape, and the ring axis being set apart from the center point of the recess.

12. The gear mechanism according to claim 9, wherein an axial region covered by the projection is encompassed by an axial region covered by the eccentric core region, and/or an axial region covered by the thrust washer overlaps with the axial region covered by the eccentric core region.

13. The gear mechanism according to claim 9, wherein the projection is positively connected to the eccentric core region and/or elastically pressed onto the eccentric core region in the radial direction.

14. The gear mechanism according to claim 5, wherein the eccentric shaft has a section that is out of round and on which the ring gear is connected to the eccentric shaft in a torsionally fixed manner.

15. The gear mechanism according to claim 14, wherein the section that is formed out of round is axially set apart from the eccentric core region.

16. The gear mechanism according to claim 14, wherein the section that is formed out of round has a hypotrochoidal shape, is shaped as a hypotrochoid, and/or includes hypotrochoidal sections.

17. The gear mechanism according to claim 14, wherein the ring gear has a recess that is shaped to match the section that is formed out of round such that the ring gear is connected to the eccentric shaft in a torsionally fixed and playfree manner with the aid of the out-of-round section.

18. The gear mechanism according to claim 5, wherein the eccentric core region is arranged as a cylindrical section disposed parallel to but at a distance from, and not coaxially to, a center axis of the eccentric shaft and/or the ring gear.

19. The gear mechanism according to claim 5, wherein an external toothing of the disk meshes with a hollow wheel and/or with a housing-forming hollow wheel.

20. The gear mechanism according to claim 19, wherein the external toothing is arranged as an involute tooth system.

21. The gear mechanism according to claim 5, wherein the eccentric shaft has a further eccentric core region axially set apart from the eccentric core region and has an offset of 180.degree. in the circumferential direction, the eccentric core regions having the same shape.

22. The gear mechanism according to claim 5, wherein the eccentric shaft is rotatably mounted and accommodated in an output shaft of the gear mechanism, and an axis of the eccentric shaft is arranged parallel to and at a distance from an axis of the output shaft.

23. The gear mechanism according to claim 5, wherein the output shaft is rotatably mounted in the hollow wheel with the aid of at least one angular contact bearing.

24. The gear mechanism according to claim 5, wherein the ring gear meshes with a sun-gear toothing disposed coaxially to the output shaft, the ring gear, the sun-gear toothing, and at least one further ring gear forming a spur-gear distribution gear stage.

25. The gear mechanism according to claim 24, wherein the sun-gear toothing is arranged in a torsionally fixed and coaxial manner with respect to a toothed wheel that meshes with a toothed part and/or a pinion that is directly driven by an electric motor and/or is driven via a coupling.

26. The gear mechanism according to claim 5, wherein the eccentric shaft has a further eccentric core region on which a second externally toothed disk of the gear mechanism is rotatably mounted, an external toothing of the second disk meshing with an internal toothing of the hollow wheel.

27. The gear mechanism according to claim 5, wherein the output shaft is arranged as a planet-gear carrier shaft.

* * * * *